US012055078B2

(12) United States Patent
Nishida

(10) Patent No.: US 12,055,078 B2
(45) Date of Patent: Aug. 6, 2024

(54) INTERNAL COMBUSTION ENGINE AND STRADDLED VEHICLE

(71) Applicant: YAMAHA HATSUDOKI KABUSHIKI KAISHA, Iwata (JP)

(72) Inventor: Kenji Nishida, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 18/335,588

(22) Filed: Jun. 15, 2023

(65) Prior Publication Data

US 2024/0018887 A1 Jan. 18, 2024

(30) Foreign Application Priority Data

Jun. 29, 2022 (JP) ................................ 2022-104891

(51) Int. Cl.

*F01M 13/04* (2006.01)
*F01M 1/02* (2006.01)
*F01M 1/16* (2006.01)
*F01M 11/00* (2006.01)
*F01M 11/02* (2006.01)
*F02M 35/10* (2006.01)

(52) U.S. Cl.

CPC .......... *F01M 11/0004* (2013.01); *F01M 1/02* (2013.01); *F01M 1/16* (2013.01); *F01M 11/02* (2013.01); *F02M 35/10222* (2013.01); *F01M 2011/0037* (2013.01)

(58) Field of Classification Search

CPC ........... F01M 13/0416; F01M 13/0011; F01M 13/04; F01M 2013/0438; F02M 25/06

See application file for complete search history.

(56) References Cited

U.S. PATENT DOCUMENTS 7,017,546 B1 * 3/2006 Patel ...................... F01M 13/04 123/198 C
2007/0151787 A1 * 7/2007 Ashida .................. B62M 27/02 180/190
2008/0173274 A1 * 7/2008 Inui ......................... F01M 1/02 123/196 R
2015/0136065 A1 * 5/2015 Kong .................... F01M 11/02 123/196 CP
2018/0346052 A1 * 12/2018 Uchida ................... B62J 35/00

FOREIGN PATENT DOCUMENTS

JP 2009243437 A * 10/2009
JP 2010-053852 A 3/2010

* cited by examiner

*Primary Examiner* — Syed O Hasan
(74) *Attorney, Agent, or Firm* — Rabin & Berdo, P.C.

(57) ABSTRACT

An internal combustion engine includes: a crankshaft; a crankcase that supports the crankshaft; an oil tank that is at least partially partitioned by the crankcase; a scavenge pump including a first intake port and a first discharge port; a feed pump including a pump shaft, a second intake port and a second discharge port, oil that has been sucked in through the second intake port as the pump shaft rotates being discharged through the second discharge port; a scavenge discharge passageway connecting the first discharge port of the scavenge pump to the oil tank; and a feed intake passageway connecting the oil tank to the second intake port of the feed pump. As viewed from the axial direction of the pump shaft, at least a portion of the feed pump and the oil tank overlap each other.

17 Claims, 6 Drawing Sheets

INTERNAL COMBUSTION ENGINE AND STRADDLED VEHICLE

CROSS-REFERENCE TO RELATED APPLICATIONS

This application claims the benefit of priority to Japanese Patent Application No. 2022-104891 filed on Jun. 29, 2022, the entire contents of which are hereby incorporated herein by reference.

BACKGROUND OF THE INVENTION

Field of the Invention

The present invention relates to a dry-sump internal combustion engine and a straddled vehicle having the same.

Description of the Related Art

A dry-sump internal combustion engine having an oil tank which is at least partially partitioned by a crankcase has been known in the art. For example, JP 2010-53852A discloses such an internal combustion engine.

The internal combustion engine disclosed in JP 2010-53852A has an oil tank arranged rearward of an oil pan and a feed pump arranged forward of the oil pan. An oil pan is arranged between the oil tank and the feed pump. An oil passageway connecting between the oil tank and the feed pump is formed downward of the oil pan (see FIG. 8 of JP 2010-53852A). The drive shaft of the oil pump extends in the left-right direction, and the oil passageway extends forward from the oil tank.

With the internal combustion engine described above, the feed pump includes an intake port that is open downward. The oil in the oil tank flows forward through the oil passageway arranged downward of the oil pan, then flows upward, and is sucked upward into the intake port of the feed pump. Now, if the feed pump can quickly suck in oil from the oil tank immediately after the start of the internal combustion engine, the pressure of the oil discharged from the feed pump can be quickly increased. Therefore, from immediately after the start of the internal combustion engine, oil can be supplied desirably to the sliding parts of the internal combustion engine.

SUMMARY OF THE INVENTION

The present invention has been made in view of the above, and an object thereof is to provide a dry-sump internal combustion engine and a straddled vehicle having the same, with which oil can be supplied desirably from immediately after the start of the internal combustion engine.

An internal combustion engine disclosed herein includes: a crankcase that supports a crankshaft; an oil tank that is at least partially partitioned by the crankcase; a scavenge pump including a first intake port and a first discharge port; a feed pump including a pump shaft, a second intake port and a second discharge port, and configured to discharge oil, which has been sucked in through the second intake port as the pump shaft rotates, through the second discharge port; a scavenge discharge passageway connecting together the first discharge port of the scavenge pump and the oil tank; and a feed intake passageway connecting together the oil tank and the second intake port of the feed pump. As viewed from an axial direction of the pump shaft, at least a portion of the feed pump and the oil tank overlap with each other.

With the internal combustion engine described above, as viewed from the axial direction of the pump shaft, the feed pump is arranged near the oil tank. Therefore, the feed intake passageway connecting together the oil tank and the feed pump can be shortened. Since the feed intake passageway is relatively short, the feed pump can quickly suck in oil from the oil tank from immediately after the start of the internal combustion engine. Since it is possible to quickly increase the pressure of the oil discharged from the feed pump, it is possible to desirably supply oil to the sliding parts from immediately after the start of the internal combustion engine.

As viewed from the axial direction of the pump shaft, the second intake port of the feed pump and the oil tank may overlap with each other.

Then, as viewed from the axial direction of the pump shaft, the second intake port of the feed pump is arranged near the oil tank. Therefore, the feed pump can quickly suck in oil from the oil tank from immediately after the start of the internal combustion engine. It is possible to desirably supply oil to the sliding parts from immediately after the start of the internal combustion engine.

As viewed from the axial direction of the pump shaft, the pump shaft and the oil tank may overlap with each other.

The feed intake passageway may extend straight.

Then, as compared with the case where the feed intake passageway is bent, the feed pump can quickly suck in oil from the oil tank from immediately after the start of the internal combustion engine. Therefore, it is possible to desirably supply oil to the sliding parts from immediately after the start of the internal combustion engine.

The feed intake passageway may be arranged parallel to the pump shaft.

Then, the feed intake passageway and the pump shaft can be arranged in a compact arrangement.

The internal combustion engine may include: a relief passageway configured to direct oil, which is discharged from the feed pump, to the oil tank; and a relief valve provided along the relief passageway. The relief passageway may include a parallel portion that is parallel to the feed intake passageway.

Then, excess oil discharged from the feed pump can be quickly returned to the oil tank. Therefore, it is possible to reduce the oil consumption of the oil tank. Unlike the inner relief mechanism that returns excess oil discharged from the feed pump to the feed intake passageway, it is possible to avoid the risk of hydraulic pressure pulsation. Moreover, since the relief passageway includes a parallel portion that is parallel to the feed intake passageway, the relief passageway and the feed intake passageway can be arranged in a compact arrangement.

The internal combustion engine may include: an oil pan provided in the crankcase; and a scavenge intake passageway connecting together the oil pan and the first intake port of the scavenge pump. The scavenge intake passageway may include a parallel portion that is parallel to the feed intake passageway.

Then, the scavenge intake passageway and the feed intake passageway can be arranged in a compact arrangement.

A straddled vehicle disclosed herein includes the internal combustion engine described above.

One of the feed pump and the oil tank may be arranged leftward of a vehicle center line and the other one of the feed pump and the oil tank may be arranged rightward of the vehicle center line.

The oil tank may be arranged forward relative to the crankshaft in a vehicle front-rear direction.

A dimension of the oil tank in a vehicle up-down direction may be greater than a dimension of the oil tank in a vehicle front-rear direction.

An upper end of the oil tank may be located upward relative to a center of the crankshaft.

According to the present invention, it is possible to provide a dry-sump internal combustion engine and a straddled vehicle having the same, with which oil can be supplied desirably from immediately after the start of the internal combustion engine.

DETAILED DESCRIPTION OF THE PREFERRED EMBODIMENTS

Figure 1:
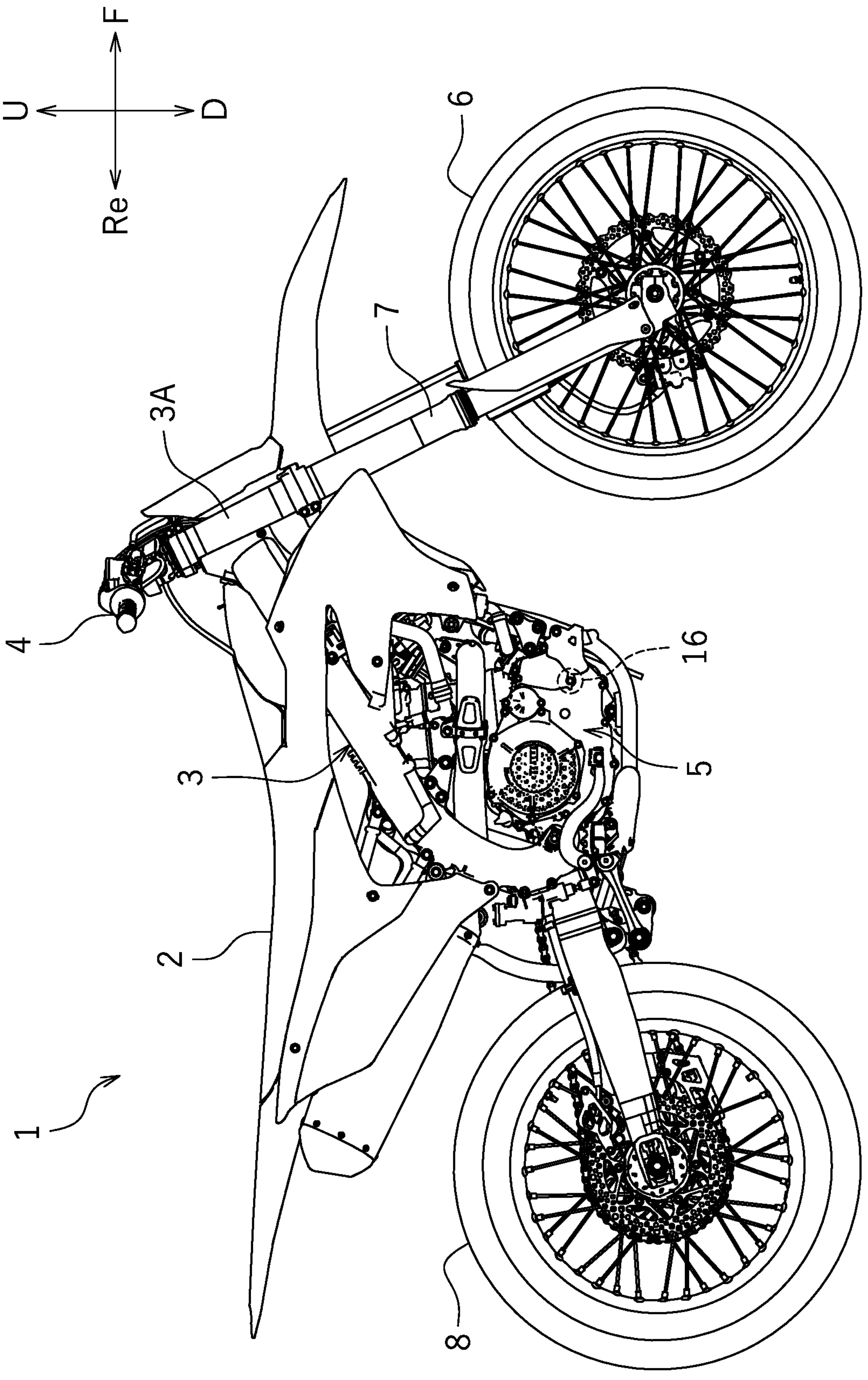
FIG. 1 is a right side view of a motorcycle according to one embodiment.
Figure 2:
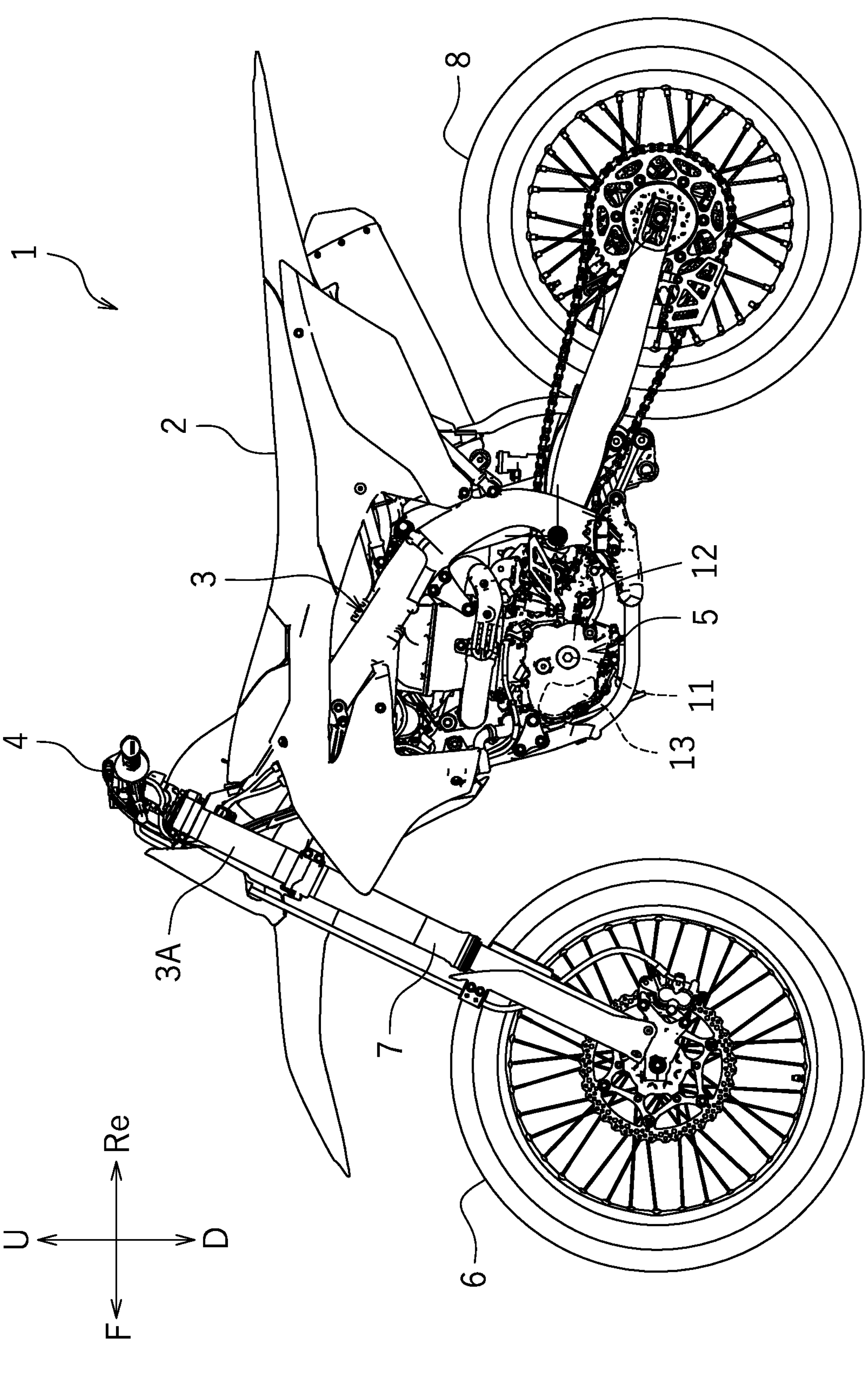
FIG. 2 is a left side view of the motorcycle.

An internal combustion engine and a straddled vehicle according to one embodiment will now be described with reference to the drawings. FIG. 1 is a right side view of a motorcycle 1, which is an example of a straddled vehicle. FIG. 2 is a left side view of the motorcycle 1.

The terms front, rear, left, right, up and down, as used in the description below, refer to these directions as viewed from a virtual rider seated on a seat 2 while the motorcycle 1 is standing upright on a horizontal surface with no rider and no load thereon, unless specified otherwise. The designations F, Re, L, R, U and D, as used in the figures, refer to front, rear, left, right, up and down, respectively.

The motorcycle 1 includes a vehicle body frame 3 with a head pipe 3A, a seat 2 on which the rider is seated, an internal combustion engine (hereinafter referred to as "engine") 5, a front wheel 6 and a rear wheel 8. A steering shaft (not shown) is supported on the head pipe 3A so that the steering shaft can rotate left and right. A handlebar 4 is fixed to an upper portion of the steering shaft. The front fork 7 is fixed to a lower portion of the steering shaft. The front wheel 6 is supported on the front fork 7.

As shown in FIG. 2, the engine 5 includes a crankcase 12 supporting a crankshaft 11, and an oil tank 13 which is at least partially partitioned by the crankcase 12. The oil tank 13 is formed in a front portion of the engine 5. The oil tank 13 is arranged forward relative to the crankshaft 11.

Figure 3:
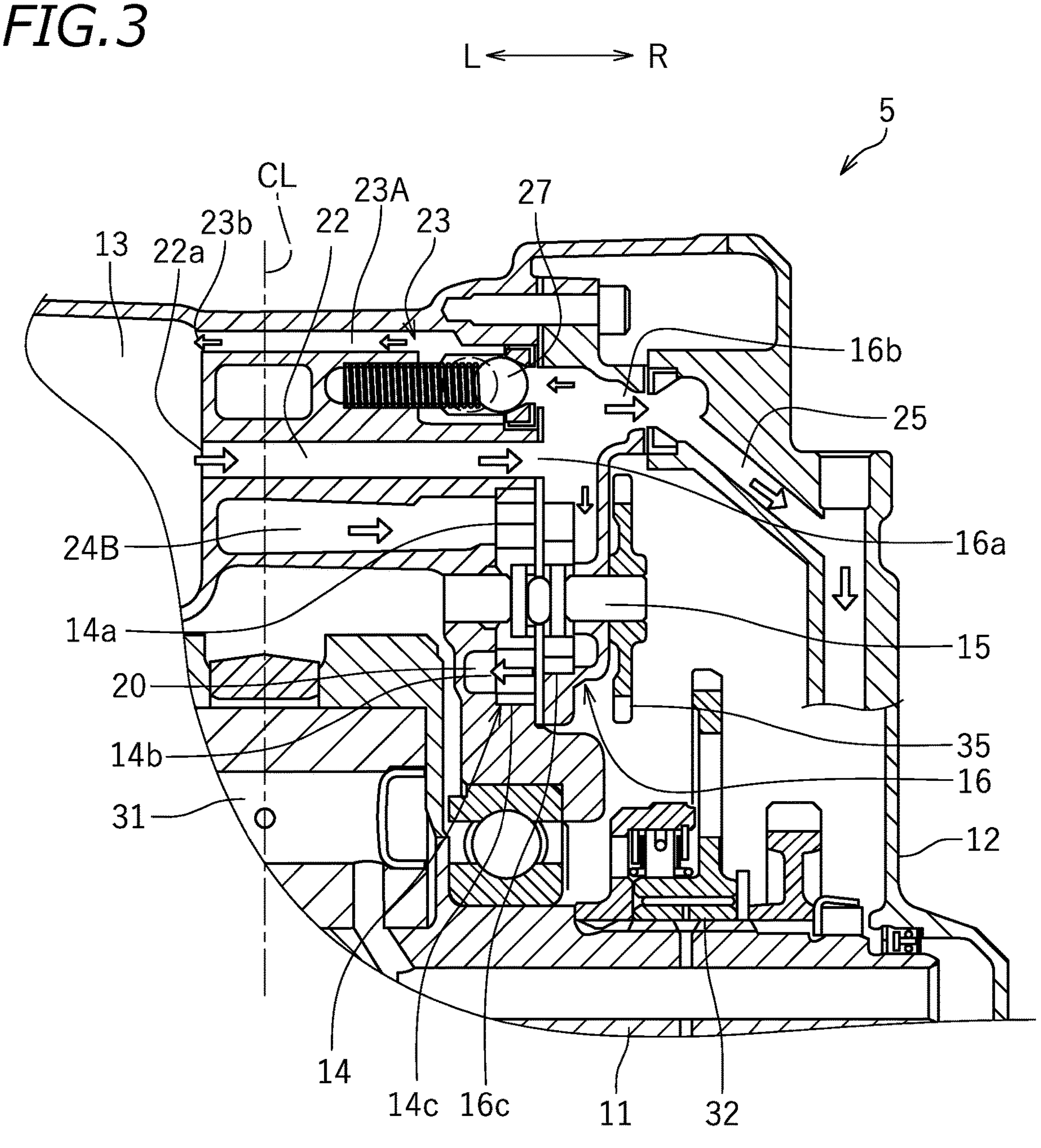
FIG. 3 is a cross-sectional view of a front portion of an internal combustion engine.
Figure 4:
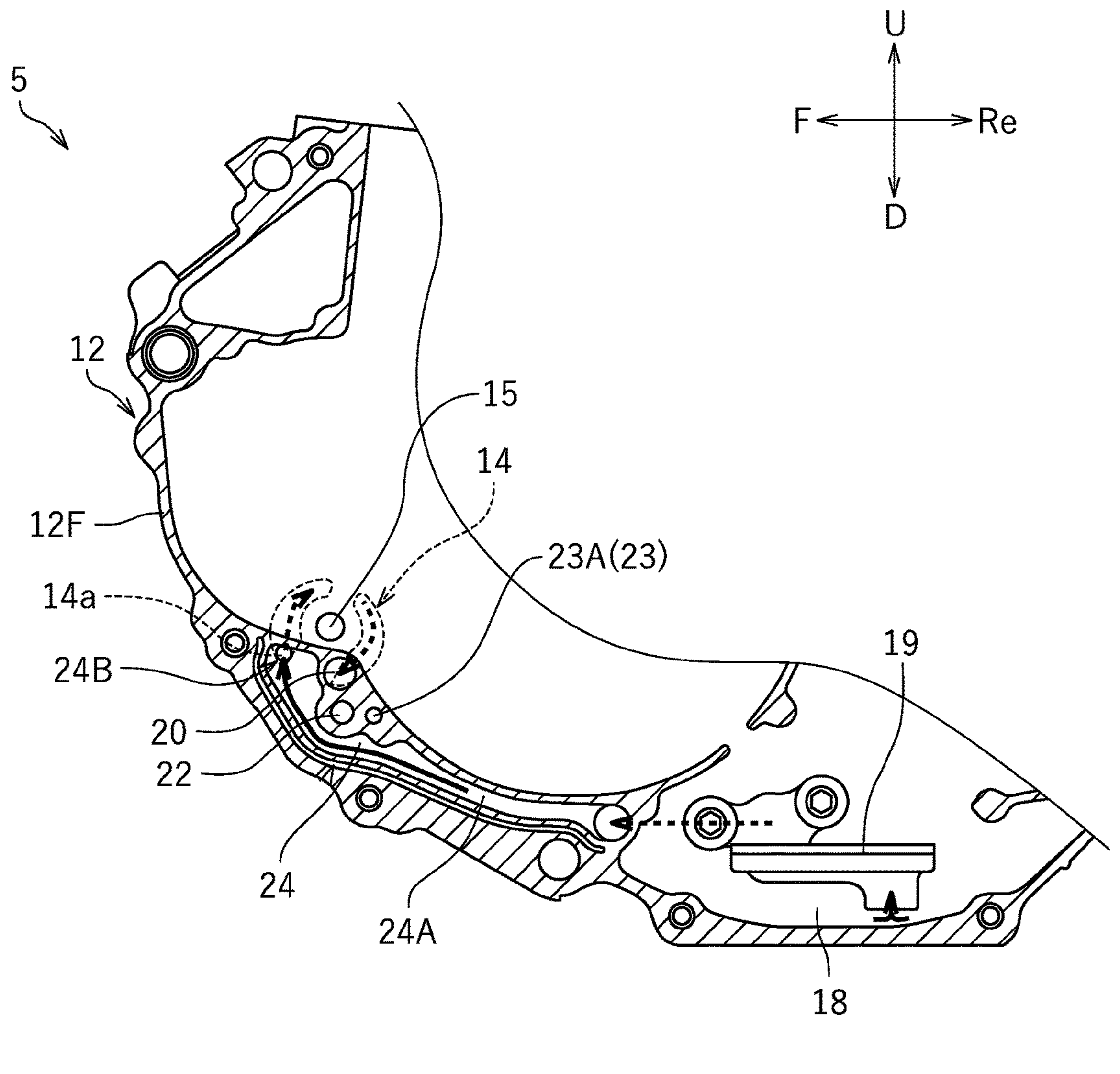
FIG. 4 is a vertical cross-sectional view of the front portion of the internal combustion engine taken along the vehicle center line.
Figure 5:
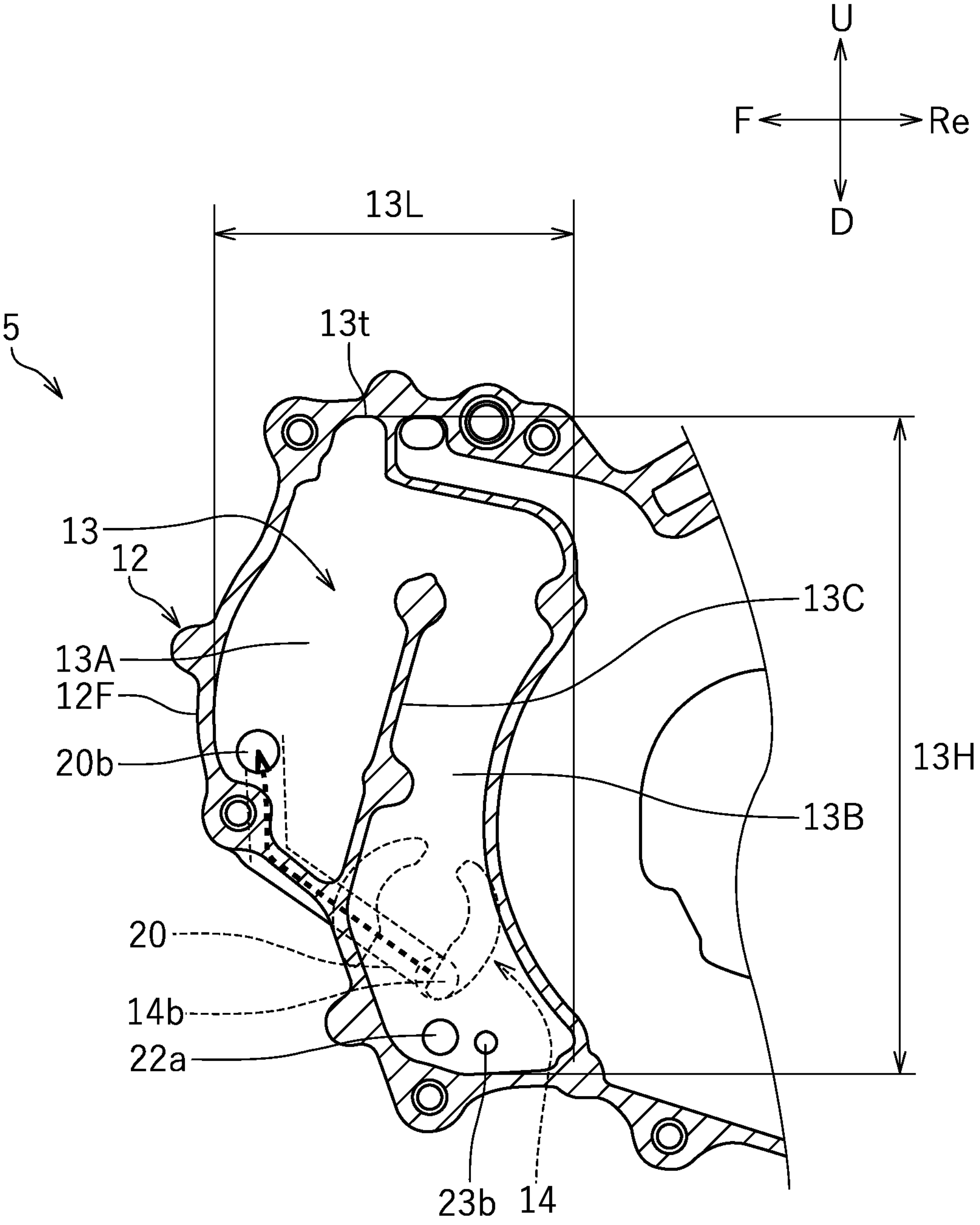
FIG. 5 is a vertical cross-sectional view of a left front portion of the internal combustion engine.
Figure 6:
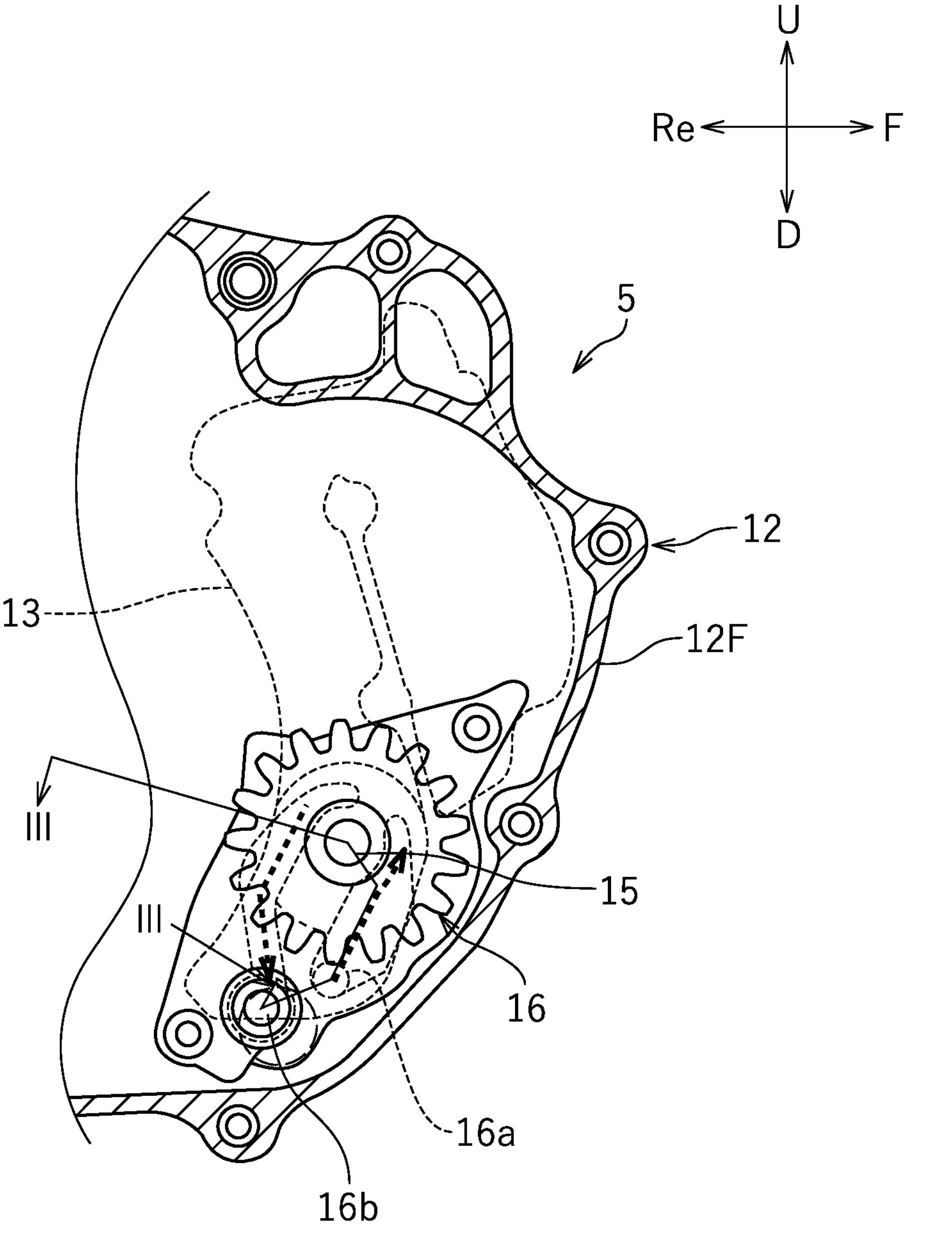
FIG. 6 is a vertical cross-sectional view of the right front portion of the internal combustion engine.

FIG. 3 is a cross-sectional view of the front portion of the engine 5, corresponding to the cross-sectional view taken along line of FIG. 6. Reference sign CL in FIG. 3 denotes the vehicle center line. FIG. 4 is a vertical cross-sectional view of the front portion of the engine 5 passing through the vehicle center line CL. FIG. 5 is a vertical cross-sectional view of the front portion of the engine 5 that is leftward relative the vehicle center line CL. That is, FIG. 5 is a vertical cross-sectional view of a left front portion of the engine 5. FIG. 6 is a vertical cross-sectional view of the front portion of the engine 5 that is rightward relative to the vehicle center line CL. That is, FIG. 6 is a vertical cross-sectional view of a right front portion of the engine 5.

As shown in FIG. 3, the oil tank 13 is arranged leftward relative to the vehicle center line CL. As shown in FIG. 5, a portion of the oil tank 13 is formed by a front wall 12F of the crankcase 12. While there is no limitation on the shape of the oil tank 13, the oil tank 13 is formed in a vertically elongate shape in the present embodiment. The dimension 13H of the oil tank 13 in the vehicle up-down direction is greater than the dimension 13L in the vehicle front-rear direction. The oil tank 13 is formed relatively upward. The upper end 13*t* of the oil tank 13 is located upward relative to the center of the crankshaft 11. The oil tank 13 is divided into a front chamber 13A and a rear chamber 13B by a vertical wall 13C composed of a portion of the crankcase 12. The front chamber 13A and the rear chamber 13B are connected together upward of the vertical wall 13C.

As shown in FIG. 3, the engine 5 includes a scavenge pump 14 and a feed pump 16. The scavenge pump 14 and the feed pump 16 are arranged rightward of the vehicle center line CL. The scavenge pump 14 includes an intake port 14*a*, a discharge 14*b* and a scavenge rotor 14*c*. The feed pump 16 includes an intake port 16*a*, a discharge port 16*b*, a pump shaft 15, and a feed rotor 16*c* fixed to the pump shaft 15. The pump shaft 15 extends in the left-right direction. The pump shaft 15 is arranged parallel to the crankshaft 11. In the present embodiment, the pump shaft 15 serves also as the pump shaft of the scavenge pump 14. The scavenge rotor 14*c* is fixed to the pump shaft 15. The pump shaft 15 is linked to the crankshaft 11 via a gear 35, or the like. The pump shaft 15 rotates under the driving force of the crankshaft 11 to rotate the scavenge rotor 14*c* and the feed rotor 16*c*. As shown in FIG. 4 and FIG. 6, the scavenge pump 14 and the feed pump 16 are arranged in the front portion of the engine 5. The scavenge pump 14 and the feed pump 16 are arranged forward relative to the crankshaft 11 (see FIG. 2).

As shown in FIG. 4, an oil pan 18 is formed at the bottom of the crankcase 12. The oil pan 18 is provided with a strainer 19.

The strainer 19 and the intake port 14*a* of the scavenge pump 14 are connected together by a scavenge intake passageway 24. The intake port 14*a* of the scavenge pump 14 is connected to the oil pan 18 via the scavenge intake passageway 24 and the strainer 19. The scavenge intake passageway 24 includes a portion 24A that extends forward and upward. The scavenge intake passageway 24 also includes a portion 24B that extends rightward (see FIG. 3). This portion 24B is a parallel portion that is parallel to the feed intake passageway 22 to be described below.

As shown in FIG. 5, the discharge port 14*b* of the scavenge pump 14 and the oil tank 13 are connected together by the scavenge discharge passageway 20. In FIG. 5, reference sign 20*b* denotes the outlet of the scavenge discharge passageway 20. Note that the outlet 20*b* of the scavenge discharge passageway 20 serves also as the inlet of the oil tank 13.

As shown in FIG. 3, the oil tank 13 and the intake port 16*a* of the feed pump 16 are connected together by the feed intake passageway 22. While the feed intake passageway 22 may be curved, it extends straight in the present embodiment. The feed intake passageway 22 extends straight in the left-right direction. The feed intake passageway 22 is arranged parallel to the pump shaft 15. In FIG. 5, reference sign 22*a* denotes the inlet of the feed intake passageway 22. Note that the inlet 22*a* of the feed intake passageway 22 serves also as the outlet of the oil tank 13.

As shown in FIG. 3, a feed discharge passageway 25 is connected to the discharge port 16*b* of the feed pump 16. The feed discharge passageway 25 is connected to sliding parts of the engine 5 such as a crank pin 31, a bearing 32, etc. The oil discharged from the feed pump 16 is supplied to the sliding parts.

The engine 5 includes a relief passageway 23 that guides the oil discharged from the feed pump 16 to the oil tank 13. In FIG. 5, reference sign 23*b* denotes the outlet of the relief passageway 23. As shown in FIG. 3, a relief valve 27 is provided in the relief passageway 23. The relief valve 27 is configured to close when the discharge pressure of the feed pump 16 is less than the threshold value and to open when the pressure becomes equal to or greater than the threshold value. When the discharge pressure of the feed pump 16 becomes equal to or greater than the threshold value, a portion of the oil discharged from the feed pump 16 is returned to the oil tank 13 through the relief passageway 23. The relief passageway 23 includes a parallel portion 23A that is parallel to the feed intake passageway 22. The parallel portion 23A extends in the left-right direction as does the feed intake passageway 22.

As described above, the feed pump 16 and the oil tank 13 are arranged in the front portion of the engine 5. As shown in FIG. 6, at least a portion of the feed pump 16 and the oil tank 13 overlap with each other as viewed from the axial direction of the pump shaft 15. Here, the intake port 16*a* of the feed pump 16 and the oil tank 13 overlap with each other as viewed from the axial direction of the pump shaft 15. As viewed from the axial direction of the pump shaft 15, the pump shaft 15 and the oil tank 13 overlap with each other. As shown in FIG. 5, at least a portion of the scavenge pump 14 and the oil tank 13 overlap with each other as viewed from the axial direction of the pump shaft 15.

Next, the oil circulation in the engine 5 will be described. The oil in the oil pan 18 is purified by the strainer 19 and is sucked into the scavenge pump 14 through the scavenge intake passageway 24. The oil discharged from the scavenge pump 14 is supplied to the oil tank 13 through the scavenge discharge passageway 20. The oil from the oil tank 13 is sucked into the feed pump 16 through the feed intake passageway 22. The oil discharged from the feed pump 16 is supplied to the sliding parts through the feed discharge passageway 25. When the discharge pressure of the feed pump 16 becomes equal to or greater than the threshold value, the relief valve 27 opens and some of the oil discharged from the feed pump 16 returns to the oil tank 13 through the relief passageway 23. The oil supplied to the sliding parts is collected in the oil pan 18 after lubricating the sliding parts.

The engine 5 according to the present embodiment is configured as described above. With the engine 5 according to the present embodiment, at least a portion of the feed pump 16 and the oil tank 13 overlap with each other as viewed from the axial direction of the pump shaft 15 so that the feed pump 16 is arranged near the oil tank 13 as viewed from the axial direction of the pump shaft 15. Therefore, the feed intake passageway 22 connecting together the oil tank 13 and the feed pump 16 can be shortened. Because the feed intake passageway 22 is relatively short, the feed pump 16 can quickly suck in oil from the oil tank 13 from immediately after the start of the engine 5. The feed pump 16 can quickly increase the oil pressure. Therefore, with the engine 5 according to the present embodiment, it is possible to desirably supply oil to the sliding parts from immediately after the start.

According to the present embodiment, the intake port 16*a* of the feed pump 16 and the oil tank 13 overlap with each other as viewed from the axial direction of the pump shaft 15 (see FIG. 6). As viewed from the axial direction of the pump shaft 15, the intake port 16*a* of the feed pump 16 is arranged near the oil tank 13. Therefore, the feed pump 16 can quickly suck in oil from the oil tank 13 from immediately after the start of the engine 5. It is possible to desirably supply oil to the sliding parts from immediately after the start of the engine 5.

According to the present embodiment, the feed intake passageway 22 extends straight (see FIG. 3). As compared with the case where the feed intake passageway 22 is bent, the feed pump 16 can quickly suck in oil from the oil tank 13 from immediately after the start of the engine 5. Therefore, it is possible to desirably supply oil to the sliding parts from immediately after the start of the engine 5.

According to the present embodiment, the feed intake passageway 22 is arranged parallel to the pump shaft 15. The feed intake passageway 22 and the pump shaft 15 can be arranged in a compact arrangement.

According to the present embodiment, the engine 5 includes the relief passageway 23 and the relief valve 27. With the relief passageway 23, excess oil discharged from the feed pump 16 can be quickly returned to the oil tank 13. Therefore, it is possible to reduce the oil consumption of the oil tank 13. Unlike the inner relief mechanism that returns excess oil discharged from the feed pump 16 to the feed intake passageway 22, it is possible to avoid the risk of hydraulic pressure pulsation. Moreover, according to the present embodiment, the relief passageway 23 includes a parallel portion 23A that is parallel to the feed intake passageway 22. The relief passageway 23 and the feed intake passageway 22 can be arranged in a compact arrangement.

According to the present embodiment, the scavenge intake passageway 24 includes a parallel portion 24B that is parallel to the feed intake passageway 22. Thus, the scavenge intake passageway 24 and the feed intake passageway 22 can be arranged in a compact arrangement.

While one embodiment has been described above, the above embodiment is merely an example, and various other embodiments are possible.

In the embodiment described above, a portion of the feed pump 16 overlaps with the oil tank 13 as viewed from the axial direction of the pump shaft 15, but the feed pump 16 may entirely overlap with the oil tank 13. As viewed from the axial direction of the pump shaft 15, the intake port 16*a* of the feed pump 16 does not need to overlap with the oil tank 13. As viewed from the axial direction of the pump shaft 15, the pump shaft 15 and the oil tank 13 does not need to overlap with each other.

The feed intake passageway 22 and the pump shaft 15 does not need to be parallel to each other.

The relief passageway 23 does not need to include a parallel portion 23A that is parallel to the feed intake passageway 22. The engine 5 does not need to include the relief passageway 23.

The scavenge intake passageway 24 does not need to include the parallel portion 24B that is parallel to the feed intake passageway 22.

At least a portion of the feed pump 16 and at least a portion of the oil tank 13 may both be arranged leftward of the vehicle center line CL or may both be arranged rightward of the vehicle center line CL.

At least a portion of the oil tank 13 may be arranged rearward of the crankshaft 11. The shape of the oil tank 13 does not need to be vertically elongate. The dimension 13H of the oil tank 13 in the up-down direction may be less than or equal to the dimension 13L of the oil tank 13 in the front-back direction. The upper end 13*t* of the oil tank 13 may be located downward relative to the center of the crankshaft 11.

A straddled vehicle refers to a vehicle that is straddled by the rider. The straddled vehicle is not limited to the motorcycle 1. The straddled vehicle may be an auto tricycle, an ATV (All Terrain Vehicle), or a snowmobile, for example.

The terms and expressions used herein are used for explanation purposes and should not be construed as being restrictive. It should be appreciated that the terms and expressions used herein do not eliminate any equivalents of features illustrated and mentioned herein, but include various modifications falling within the claimed scope of the present invention. The present invention may be embodied in many different forms. The present disclosure is to be considered as providing examples of the principles of the invention. These examples are described herein with the understanding that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

What is claimed is:

1. An internal combustion engine for installation in a straddled vehicle, the internal combustion engine comprising:
- a crankshaft;
- a crankcase that supports the crankshaft;
- an oil tank that is at least partially partitioned by the crankcase;
- a scavenge pump including a first intake port and a first discharge port;
- a feed pump including a pump shaft, a second intake port and a second discharge port, oil that has been sucked in through the second intake port as the pump shaft rotates being discharged through the second discharge port;
- a scavenge discharge passageway connecting the first discharge port of the scavenge pump to the oil tank; and
- a feed intake passageway connecting the oil tank to the second intake port of the feed pump, wherein
  - the feed pump is arranged outside the oil tank, and as viewed from an axial direction of the pump shaft, at least a portion of the feed pump and the oil tank overlap each other; and
  - the feed pump and the oil tank are so configured that one of the feed pump and the oil tank is arranged leftward of a center line of the straddled vehicle, and the other one of the feed pump and the oil tank is arranged rightward of the center line of the straddled vehicle.

2. The internal combustion engine according to claim 1, wherein
- as viewed from the axial direction of the pump shaft, the second intake port of the feed pump and the oil tank overlap each other.

3. The internal combustion engine according to claim 1, wherein
- as viewed from the axial direction of the pump shaft, the pump shaft and the oil tank overlap each other.

4. The internal combustion engine according to claim 1, wherein
- the feed intake passageway extends straight.

5. The internal combustion engine according to claim 4, wherein
- the feed intake passageway is arranged in parallel to the pump shaft.

6. The internal combustion engine according to claim 4, further comprising:
- a relief passageway configured to direct the oil that is discharged from the feed pump to the oil tank; and
- a relief valve provided in the relief passageway, wherein
  - the relief passageway includes a parallel portion that is parallel to the feed intake passageway.

7. The internal combustion engine according to claim 4, further comprising:
- an oil pan provided in the crankcase; and
- a scavenge intake passageway connecting the oil pan to the first intake port of the scavenge pump, wherein
  - the scavenge intake passageway includes a parallel portion that is parallel to the feed intake passageway.

8. A straddled vehicle, comprising:
- an internal combustion engine including:
  - a crankshaft;
  - a crankcase that supports the crankshaft;
  - an oil tank that is at least partially partitioned by the crankcase;
  - a scavenge pump including a first intake port and a first discharge port;
  - a feed pump including a pump shaft, a second intake port and a second discharge port, oil that has been sucked in through the second intake port as the pump shaft rotates being discharged through the second discharge port;
  - a scavenge discharge passageway connecting the first discharge port of the scavenge pump to the oil tank; and
  - a feed intake passageway connecting the oil tank to the second intake port of the feed pump, wherein
- the feed pump is arranged outside the oil tank, and as viewed from an axial direction of the pump shaft, at least a portion of the feed pump and the oil tank overlap each other, and
- one of the feed pump and the oil tank is arranged leftward of a center line of the straddled vehicle, and the other one of the feed pump and the oil tank is arranged rightward of the center line of the straddled vehicle.

9. The straddled vehicle according to claim 8, wherein the oil tank is arranged further forward than the crankshaft in a front-rear direction of the straddled vehicle.

10. The straddled vehicle according to claim 8, wherein
- the oil tank is wider in an up-down direction of the straddled vehicle than in a front-rear direction of the straddled vehicle.

11. The straddled vehicle according to claim 8, wherein
- an upper end of the oil tank is located further upward than a center of the crankshaft.

12. The straddled vehicle e according to claim 8, wherein
- as viewed from the axial direction of the pump shaft, the second intake port of the feed pump and the oil tank overlap each other.

13. The straddled vehicle according to claim 8, wherein as viewed from the axial direction of the pump shaft, the pump shaft and the oil tank overlap each other.

14. The straddled vehicle according to claim 8, wherein the feed intake passageway extends straight.

15. The straddled vehicle according to claim 14, wherein the feed intake passageway is arranged in parallel to the pump shaft.

16. The straddled vehicle according to claim 14, wherein the internal combustion engine further includes:

a relief passageway configured to direct the oil that is discharged from the feed pump to the oil tank; and a relief valve provided in the relief passageway, wherein the relief passageway includes a parallel portion that is parallel to the feed intake passageway.

17. The straddled vehicle according to claim 14, wherein the internal combustion engine further includes:

an oil pan provided in the crankcase; and a scavenge intake passageway connecting the oil pan to the first intake port of the scavenge pump, wherein the scavenge intake passageway includes a parallel portion that is parallel to the feed intake passageway.

* * * * *